H. RENOLD AND A. E. CARTER.
DRIVING CHAIN.
APPLICATION FILED AUG. 17, 1917.

1,306,561. Patented June 10, 1919.

HANS RENOLD
ADRIAN ETHELBERT CARTER, INVENTORS
by Lawrence Langner
ATTORNEY

UNITED STATES PATENT OFFICE.

HANS RENOLD AND ADRIAN ETHELBERT CARTER, OF MANCHESTER, ENGLAND, ASSIGNORS TO HANS RENOLD LIMITED, OF MANCHESTER, ENGLAND.

DRIVING-CHAIN.

1,306,561.     Specification of Letters Patent.     Patented June 10, 1919.

Application filed August 17, 1917. Serial No. 186,753.

*To all whom it may concern:*

Be it known that we, HANS RENOLD and ADRIAN ETHELBERT CARTER, both subjects of the King of Great Britain, and residents of Burnage Works, Didsbury, Manchester, in the county of Lancaster, England, have invented certain new and useful Improvements Relating to Driving-Chains, of which the following is a specification.

This invention relates to driving chains of the silent type. It is the object of the invention to provide an improved construction for such chains allowing of more effective lubrication of their bearing surfaces.

In the accompanying drawings:—

Figure 1:
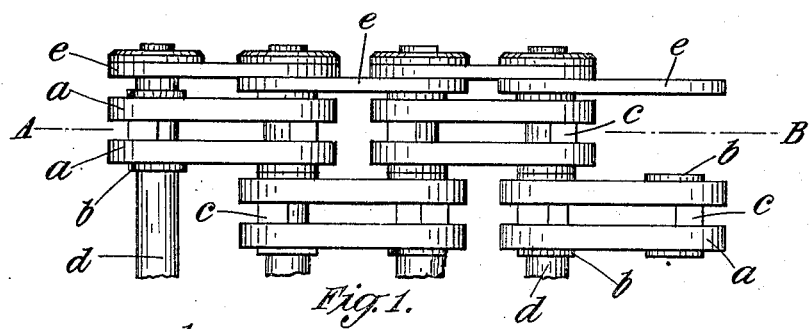

Figure 1 shows a partial plan view, and

Figure 2:
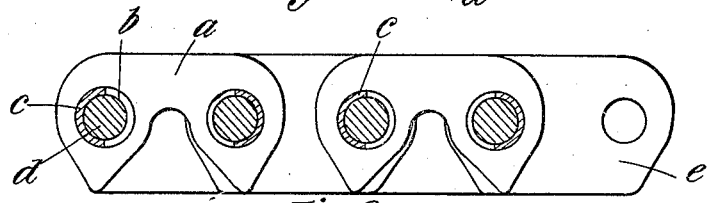

Fig. 2, a section on the line A—B of Fig. 1, illustrating one form of construction according to the invention.

Figure 3:
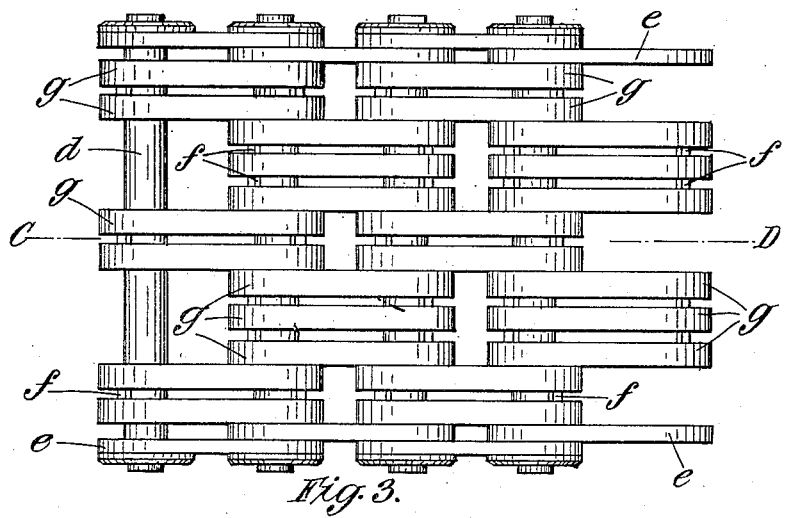

Fig. 3 shows a plan view, and

Figure 4:
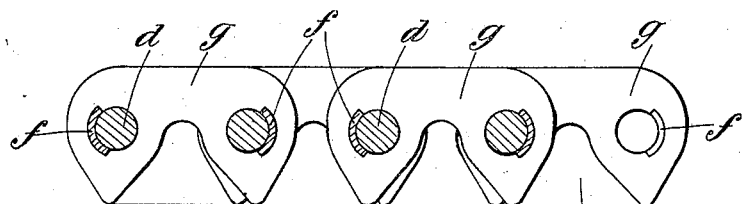

Fig. 4, a section on the line C—D of Fig. 3 illustrating another form of construction.

Referring first to Figs. 1 and 2, the chain there shown is made up of block link units or blocks substantially corresponding with those shown in Fig. 4 of Patent No. 690,317, except that the cylindrical bushes are partially cut away at the center in order to provide a clear space for lubrication on the studs. Each unit or block of the chain consists in this case of a pair of links *a* permanently connected at each end by a cylindrical bush *b* which may project slightly beyond the side faces of the links as shown. Before or after assembling the link units *a* and bushes *b*, these latter are partially cut away at the central portion between the links *a* leaving segmental bearing surfaces *c* which serve to connect and space apart the links *a* to form the block units of which the chain is composed, while also bearing on the studs *d*, on the side where the pressure is applied when the chain is in tension. The chain is shown as having plain links *e* at the side, which serve to connect the studs in the alternate pitches and also to act as guide links.

Figs. 3 and 4 show a preferred form of construction. In this case silent chain links *g* are used which are slotted only to receive segmental bushes or liners *f* onto which they are mounted. In the example shown, in order that the chain may have a balanced arrangement with equal numbers of gear links in each pitch, block units are made up having in some cases three links *g* connected by a pair of segmental bushes *f*, and in other cases two links so connected. In the one pitch then, there are two block units each having three gear links, while in the next pitch there are three block units each having two gear links *g*. Any other suitable arrangement may be adopted however.

The segmental bushes *f* are preferably formed of steel of the precise thickness required, shaped to the correct curvature in a punching operation. The links *g* are then slotted in the known manner to receive the segmental bushes, and are made up into block units by forcing the bushes into the links so as to leave the links spaced apart on the bushes in the manner shown. The spaces left as shown between the links of each block unit give free access for lubrication to the studs *d* where they are exposed, and the lubricant is thus well distributed over the whole length of each stud at all times, provided that the chain is kept adequately supplied with lubricant in any suitable manner.

The block units are easy to assemble, and as there is no overlapping of the bushes it is always easy to take out and replace a damaged unit at any time if required. Owing to the accuracy with which the segmental bushes can be formed, and to the fact that they require no machining, the block units are found to be very true in pitch, so that there is very little wear or extension in the bedding down of the chain when it is first put into operation, and it should have a long effective life.

It is to be understood that chains may be made up of block units having any convenient number of gear links *g* in each, and combined together to form multiple strand chains with any required number of block units in each pitch.

Throughout this specification and the claims which follow, the term "block unit" means a separate block or element for a chain, consisting of two or more gear links permanently and inseparably united by a pair of bushes, such block unit being adapted to be mounted directly on the studs of a chain in staggered relation to other block units in adjacent pitches of the chain. Such block units are essentially separable from other block units of the same chain merely by removing the studs on which they are mounted and without removing from the links the bushes which are an integral part of each unit.

Having thus described our invention what we claim as new and desire to secure by Letters Patent is:—

1. A block unit adapted to be mounted directly on studs in making up a multiple strand drive chain, such block unit consisting of a plurality of link plates provided with gear teeth, and a pair of bushes permanently connecting said link plates together in positions relatively spaced apart thereon, said bushes being of segmental form in the spaces between the link plates, whereby free space for lubrication is provided between the link plates of the block unit.

2. A block unit adapted to be mounted directly on studs in making up a multiple strand drive chain, such block unit consisting of a plurality of link plates provided with gear teeth, and a pair of bushes of segmental shape permanently connecting said link plates together in positions relatively spaced apart on the segmental bushes, whereby free space for lubrication is provided between the link plates of the block unit.

3. A multiple strand drive chain consisting of a plurality of independent block units, studs connecting said block units, and means for securing the studs in position, such block units being mounted on the studs in staggered relation in one pitch with respect to the block units of adjacent pitches, each block unit consisting of a plurality of link plates provided with gear teeth, and a pair of bushes permanently connecting said link plates together in positions relatively spaced apart thereon, said bushes being of segmental form in the spaces between the link plates, whereby free space for direct lubrication of the bearing surfaces on the studs is provided in the intervals between the link plates of each block unit.

4. A multiple strand drive chain consisting of a plurality of block units, studs connecting said block units, and means for securing the studs in position, such block units being mounted on the studs in staggered relation in one pitch with respect to the block units of adjacent pitches, each block unit consisting of a plurality of link plates provided with gear teeth, and a pair of bushes of segmental shape permanently connecting said link plates together in positions relatively spaced apart on the segmental bushes, whereby free space for direct lubrication of the bearing surfaces on the studs is provided in the intervals between the link plates of each block unit.

HANS RENOLD.
ADRIAN ETHELBERT CARTER.

Copies of this patent may be obtained for five cents each, by addressing the "Commissioner of Patents, Washington, D. C."